(12) United States Patent
Nieminen

(10) Patent No.: US 6,258,164 B1
(45) Date of Patent: Jul. 10, 2001

(54) CLEANING SYSTEM

(75) Inventor: Mika Nieminen, Espoo (FI)

(73) Assignee: Nextrom Holding S.A. (CH)

( * ) Notice: Subject to any disclaimer, the term of this patent is extended or adjusted under 35 U.S.C. 154(b) by 0 days.

(21) Appl. No.: 09/372,998

(22) Filed: Aug. 12, 1999

(30) Foreign Application Priority Data

Sep. 2, 1988 (FI) ....................................................... 981876

(51) Int. Cl.[7] ................................................... B05C 11/02
(52) U.S. Cl. ............................................. 118/125; 118/420
(58) Field of Search ...................... 65/529, 532; 118/411, 118/70, DIG. 18, 420, 125, 404, 405; 427/356; 239/106, 112, 113, 119, 109

(56) References Cited

U.S. PATENT DOCUMENTS 4,728,034  3/1988  Matsumara et al. .

FOREIGN PATENT DOCUMENTS 841 307 A1  5/1998  (EP) .

Primary Examiner—Brenda A. Lamb
(74) Attorney, Agent, or Firm—Nixon & Vanderhye P.C.

(57) ABSTRACT

A cleaning system for cleaning a coating agent feed system and nozzles used for coating a fiber. The coating agent feed system comprises a feed channel for feeding coating agent from a coating agent tank into a coating agent chamber situated in a nozzle unit, between two nozzles, and a fiber inlet channel for guiding the fiber to be coated through a first nozzle into the coating agent chamber and a fiber outlet channel for guiding the fiber through a second nozzle out of the coating agent chamber. For an intensified cleaning function, the cleaning system comprises a second feed channel for steeping agent, positioned in the nozzle unit. The feed channel opens into the coating agent chamber. A change valve is arranged between an outlet end of the coating agent feed channel at the coating agent chamber and an outlet end of the second feed channel at the coating agent chamber, the change valve being arranged to close the second feed channel in one position and the coating agent feed channel in the other position.

6 Claims, 2 Drawing Sheets

CLEANING SYSTEM

FIELD OF THE INVENTION

The invention relates to a cleaning system for cleaning a coating agent feed system and nozzles used for coating a fiber or the like, especially an optic fiber, the coating agent feed system comprising a feed channel for feeding coating agent from a coating agent tank into a coating agent chamber situated in a nozzle unit, between two nozzles, and a fiber inlet channel for guiding the fiber to be coated through a first nozzle into the coating agent chamber and an outlet channel for guiding the fiber through a second nozzle out of the coating agent chamber.

BACKGROUND

Problems have turned up after the coating phase in different fiber lines used for instance at the manufacture of cables. In fiber coloring lines and also band fiber lines and drawing towers, for instance, it has been necessary to clean all the used nozzle units inconveniently by hand after spreading acrylate. The cleaning has taken place by detaching the used nozzle units after each drive, by disassembling them and by cleaning the parts separately and by reassembling the units and by mounting them back in place in the line for next coating phase. Such an operation is slow and laborious, delaying the production and raising the production costs at the same time. The costs are also increased by the fact that the waste of coating agent is large in the cleaning phase. This is of significance, because the coating agent, for instance acrylate, has a high price. A further drawback of the prior art technique is that the cleaning work mostly is dirty work to be done by hand and, on top of it all, dangerous substances have to be handled.

SUMMARY OF THE INVENTION

The object of the invention is to provide a cleaning system by means of which the drawbacks of the prior art technique can be eliminated. This has been achieved by means of a cleaning system of the invention, which is characterized in that the cleaning system comprises a second feed channel for steeping agent, positioned in the nozzle unit, this feed channel being arranged to open into the coating agent chamber, and that a change valve is arranged between an outlet end of the coating agent feed channel at the coating agent chamber and an outlet end of the second feed channel at the coating agent chamber, the change valve being arranged to close the second feed channel in one position and the coating agent feed channel in the other position, whereby steeping agent can be fed through the second channel into the coating agent chamber when the coating agent feed channel is closed.

An advantage of the invention is that it is not necessary to detach the nozzle unit for cleaning at all. The cleaning work is not manual either, which means that the workers do not come into contact with dangerous substances at all when cleaning. A further advantage of using this invention is that such amounts of expensive coating agent are not wasted as in the prior art technique. An advantage of the cleaning system of the invention is also that the cleaning measures can be automated in an advantageous manner.

In the following, the invention will be described in more detail by means of the attached drawings.

DETAILED DESCRIPTION OF THE DRAWINGS

Figure 1:
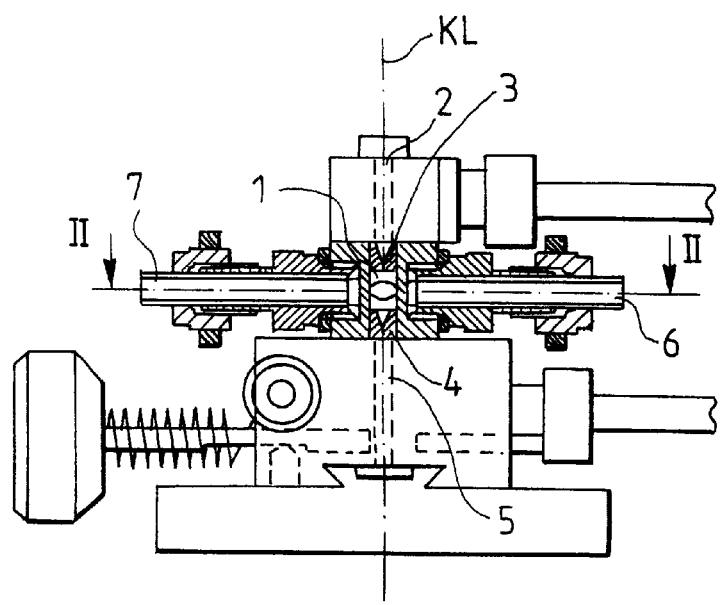
FIG. 1 shows a side view of an essential component of a cleaning system of the invention.
Figure 2:
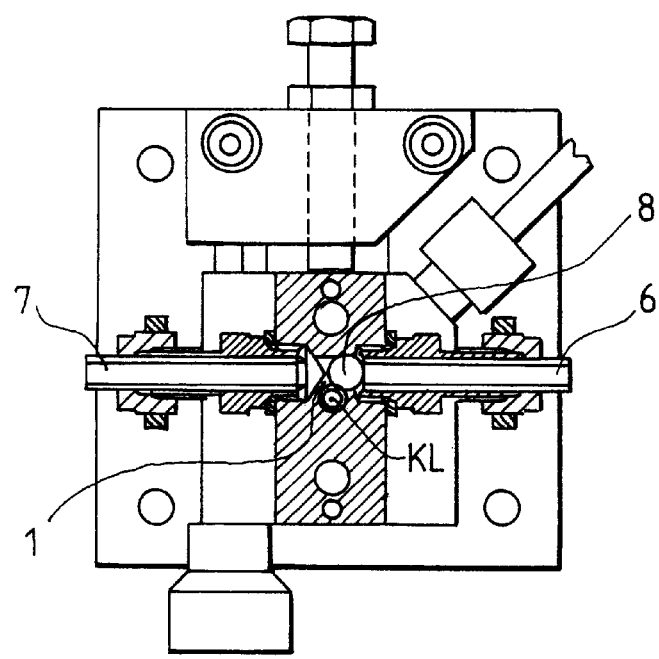
FIG. 2 shows a sectional view of the component of FIG. 1 along arrows 11—11 of FIG. 1.
Figure 3:
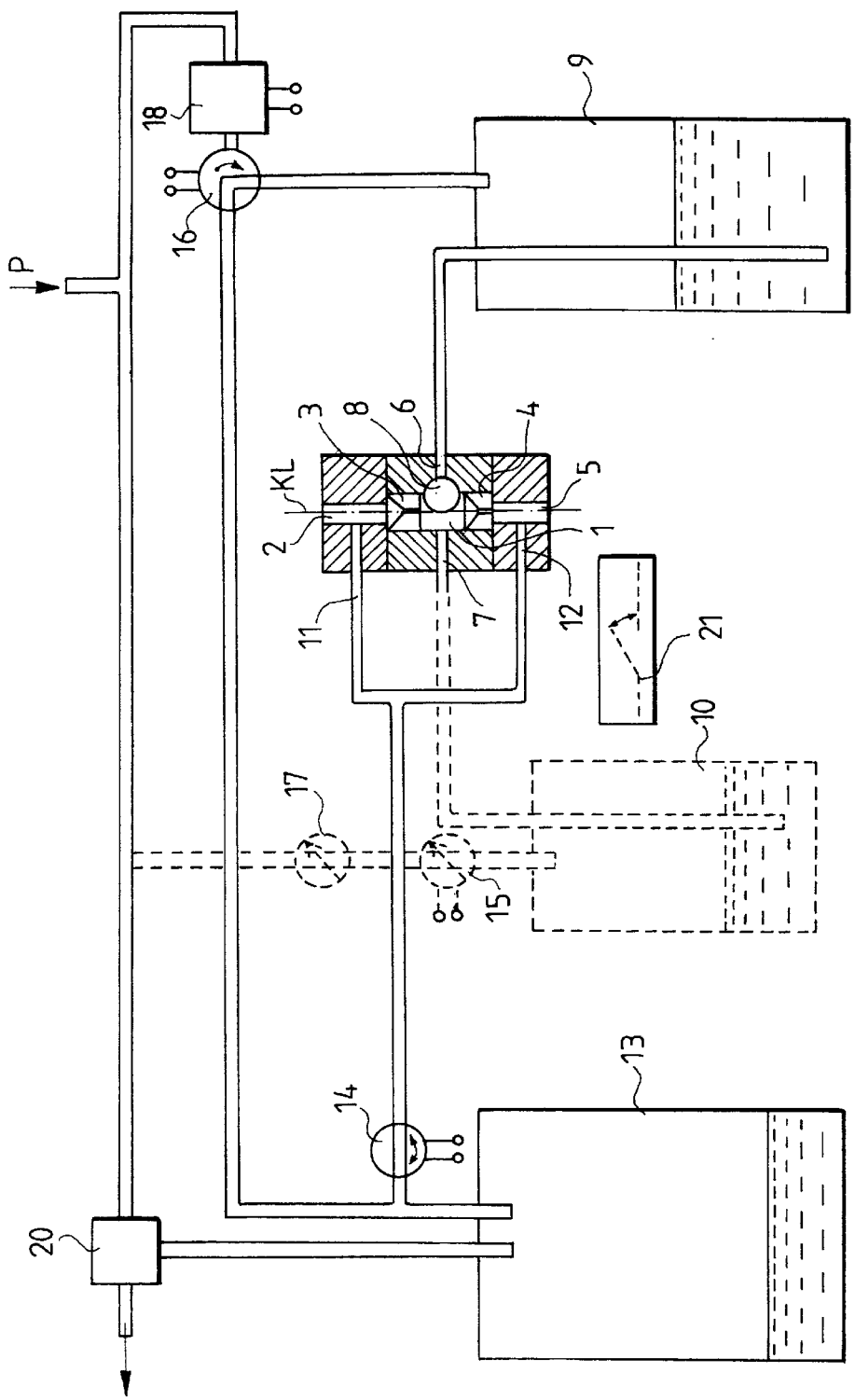
FIG. 3 shows a general view of a preferred embodiment of the cleaning system of the invention.

FIGS. 1 and 2 show a component, i.e. a nozzle unit, forming an essential part of the cleaning system of the invention. FIG. 3 shows a preferred example of it, in principle.

A coating agent chamber 1 is provided by means of the component of the FIGS. 1 and 2, through which chamber a fiber or another corresponding product running on a fiber line is arranged to move. The fiber is guided into the coating agent chamber through an inlet channel 2 and a first nozzle 3 and further out of the coating agent chamber 1 through a second nozzle 4 and an outlet channel 5. Reference mark KL designates the fiber line.

Reference numeral 6 of the figures designates a feed channel for feeding coating agent into the coating agent chamber 1 between the nozzles 3, 4.

The above facts are fully conventional technique to one skilled in the art, and therefore, they are not described any further in this connection.

In accordance with the essential idea of the invention, the cleaning system comprises a second feed channel 7 for steeping agent, positioned in the nozzle unit. The feed channel 7 is arranged to open into the coating agent chamber 1, as shown in the figure. A change valve 8 is arranged between an outlet end of the coating agent feed channel 6 at the coating agent chamber 1 and an outlet end of the second feed channel 7, i.e. steeping agent feed channel, at the coating agent chamber 1, the change valve being arranged to close the second feed channel 7 in one position and the coating agent feed channel 6 in the other position, whereby steeping agent can be fed through the second feed channel 7 into the coating agent chamber 1 when the feed channel 6 is closed. Accordingly, the change valve 8 operates always in such a way that when one channel is closed, the other one is open.

In the example of the figures, the coating agent feed channel 6 and the second feed channel 7 are arranged coaxially on the opposite sides of the nozzle unit and the change valve 8 is provided between the outlets of the feed channels 6 and 7 by means of a movably arranged closing means. The closing means can be any suitable means, such as a ball, as shown in the figures.

FIG. 3 shows a general view of the cleaning system of the invention, the system using a nozzle unit according to the FIGS. 1 and 2. The same reference numerals are used in FIG. 3 as in the FIGS. 1 and 2 for similar items.

As presented above, the nozzle unit used in the cleaning system of the invention comprises a normal coating agent chamber 1 and a coating agent channel 6 and, moreover, a second feed channel 7. A ball serving as a change valve 8 is arranged between the ends of the above feed channels opening into the coating agent chamber. The feed channel 6 is connected to a coating agent tank 9. The coating agent may be any suitable coating agent, for instance acrylate. The second feed channel 7 is, in turn, connected to a steeping agent tank 10. Reference numerals 11 and 12 indicate outlet channels, arranged to start from an inlet channel 2 and an outlet channel 5 of the fiber, respectively. In the example of FIG. 3, the outlet channel 11 is arranged to start from that place of the fiber inlet channel 2 that is positioned before the first nozzle 3 of the nozzle unit in the travel direction of the fiber, and the outlet channel 12 from that place of the fiber outlet channel that is positioned after the second nozzle 4, respectively. The outlet channels 11 and 12 are connected to a waste tank 13. Reference numerals 14 and 15 designate closing valves and reference numeral 16 designates a three-way valve. Reference numeral 17 indicates a pressure regulating means and reference numeral 18 a pressure controller. Reference numeral 20 designates an ejector. The pressure to be obtained from a pressure network is designated P.

In fiber coating phase at normal drive, a coating agent, for instance acrylate, is fed from the coating agent tank 9 through the feed channel 6 into the coating agent chamber 1. Coating agent is fed by means of pressure, i.e. the controller 18 controls normally and the three-way valve 16 is open for the pressure controller 18. The closing valves 14 and 15 are closed. When coating agent flows under pressure into the coating agent tank 1, the ball serving as a change valve 8 is pressed against the mouth of the second feed channel 7 and closes that channel. When the fiber runs through the coating agent chamber filled with coating agent, it is coated in a normal way.

Upon termination of the above coating phase, the coating agent tank can be provided with an underpressure in the following way, for instance. The pressure controller 18 is set to a position 0 and the three-way valve is subjected to an underpressure for a couple of seconds. The valves 14 and 15 are still closed. Thanks to the underpressure prevailing in the coating agent tank, the ball is pressed against the mouth of the feed channel 6 and closes that channel.

The next phase is the cleaning phase, in which an open cleaning switch 21 is closed, through which a cleaning portion shown with broken lines is started. The cleaning switch 21 is shown in principle, in order to show that this switch activates the part of the system of the invention which is indicated by the broken lines. In this phase, the pressure controller 18 is still in the position 0 and the three-way valve is subjected to underpressure. The valves 14 and 15 are open in this phase and the pressure regulating means 17 has regulated a suitable pressure. In consequence of these functions, steeping agent flows from the steeping agent tank 10 through the second feed channel 7 into the coating agent chamber 1. In this situation, the feed channel 6 is still closed, because the ball is pressed against the mouth of the channel 6. Accordingly, the steeping agent flows into the coating agent chamber 1 and further through the nozzles 3 and 4 both into the fiber inlet channel 2 and the fiber outlet channel 5, cleaning the chamber and the nozzles. The steeping agent can preferably be sucked by means of underpressure through the outlet channels 11 and 12 out of the nozzle unit into the waste tank 13. The waste tank 13 can be provided with underpressure by means of the ejector 20, for instance, as shown in FIG. 3. The passage of the fiber can naturally also be provided with a clap or a valve, closing the passage for the time of the cleaning.

The above example is by no means intended to restrict the invention, but the invention can be modified fully freely within the scope of the claims. It is thus clear that the invention or its details do not absolutely need to be just like shown in the figures, but solutions of other kinds are also possible. For instance, the change valve used in the invention does not necessarily need to be a ball, but the change valve can be implemented in another way, too, for instance by means of a cylinder means. As coating agent and steeping agent, any suitable substances can be used, of course, and so on.

What is claimed is:

1. A cleaning system for cleaning with a steeping agent a coating agent feed system and nozzles used for coating a fiber, the coating agent feed system comprising a feed channel for feeding coating agent from a coating agent tank into a coating agent chamber which is arranged between a first and second nozzle of a nozzle unit, and a fiber inlet channel for guiding the fiber to be coated through the first nozzle into the coating agent chamber and an outlet channel for guiding the fiber through the second nozzle out of the coating agent chamber, wherein the cleaning system comprises a second feed channel for the steeping agent, positioned in the nozzle unit, the second feed channel being arranged to open into the coating agent chamber, and a change valve arranged between an outlet end of the coating agent feed channel at the coating agent chamber and an outlet end of the second feed channel at the coating agent chamber, the change valve being arranged to close the second feed channel in one position and the coating agent feed channel in the other position, whereby steeping agent can be fed through the second channel into the coating agent chamber when the coating agent feed channel is closed.

2. A cleaning system according to claim 1, wherein the coating agent feed channel and the second feed channel are arranged coaxially on the opposite sides of the nozzle unit and the change valve is provided between the outlets of the feed channels by means of a movably arranged closing means.

3. A cleaning system according to claim 2, wherein the closing means is a ball.

4. A cleaning system according to claim 1, wherein the cleaning system comprises steeping agent outlet channels having an opening arranged in the fiber inlet channel and the fiber outlet channel, respectively.

5. A cleaning system according to claim 4, wherein the fiber inlet channel is situated before the first nozzle of the nozzle unit in the travel direction of the fiber and the fiber outlet channel is situated after the second nozzle.

6. A cleaning system according to claim 5, wherein the steeping agent is arranged to be sucked by means of underpressure through the outlet channels out of the nozzle unit.

* * * * *

UNITED STATES PATENT AND TRADEMARK OFFICE
CERTIFICATE OF CORRECTION

PATENT NO. : 6,258,164 B1
DATED : July 10, 2001
INVENTOR(S) : Nieminen

Page 1 of 1

It is certified that error appears in the above-identified patent and that said Letters Patent is hereby corrected as shown below:

<u>Title page,</u>
Item [30], Foreign Application Priority Data,
Delete "Sep. 2, 1988" and insert -- Sep. 2, 1998 --.

Signed and Sealed this

Twenty-sixth Day of March, 2002

*Attest:*

JAMES E. ROGAN
*Attesting Officer*   *Director of the United States Patent and Trademark Office*